United States Patent [19]
Becchi et al.

[11] 4,268,747
[45] May 19, 1981

[54] POSITION TRANSDUCER FOR A ROTATING MEMBER

[75] Inventors: Raffaele Becchi, Ivrea; Felice Giacone, Turin; Andrea Accattino, Salerano, all of Italy

[73] Assignee: Ing. C. Olivetti & C., S.p.A., Italy

[21] Appl. No.: 973,011

[22] Filed: Dec. 26, 1978

[30] Foreign Application Priority Data

Dec. 30, 1977 [IT] Italy .............................. 69951 A/77

[51] Int. Cl.³ .............................................. G01D 5/34
[52] U.S. Cl. ............................. 250/231 SE; 250/239
[58] Field of Search ......................... 250/231 SE, 239

[56] References Cited

U.S. PATENT DOCUMENTS

| | | | |
|---|---|---|---|
| 3,400,275 | 9/1968 | Trump ......................... | 250/231 SE |
| 3,728,551 | 4/1973 | Culver et al. ................. | 250/231 SE |
| 4,152,589 | 5/1979 | Mitchell ........................ | 250/231 SE |

*Primary Examiner*—David C. Nelms
*Assistant Examiner*—Darwin R. Hostetter
*Attorney, Agent, or Firm*—Schuyler, Banner, Birch, McKie & Beckett

[57] ABSTRACT

An angular position transducer for a rotating member comprising a notched disc connected to said member, an opto-electronic pair for sensing the angular position of said disc and a supporting shell for said pair which is fixable on the support of the rotating member coaxially to said member. The disc is fixable directly to the rotating member at a predetermined position with respect to the shell, and comprises a thin flexible lamina guided on its periphery by a guiding element adjacent to the notches. The flexibility of the lamina compensates for any disalignment and axial displacement of the rotating member. The position signal is periodic and is sent to the terminals of a reference resistor. A control circuit modifies the value of the resistor in order to stabilize the peak value of the position signal within predetermined narrow tolerance limits.

7 Claims, 13 Drawing Figures

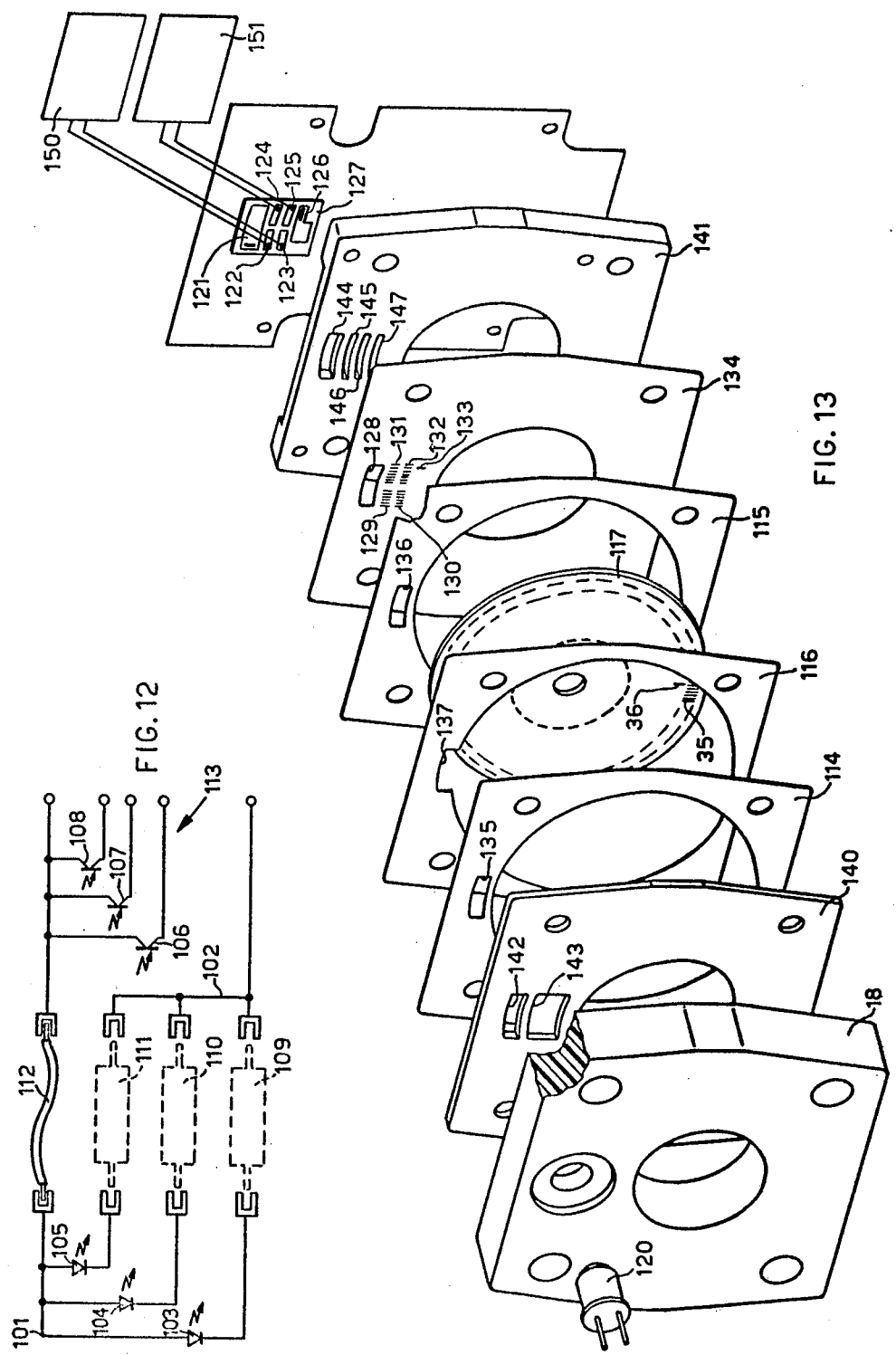

POSITION TRANSDUCER FOR A ROTATING MEMBER

BACKGROUND OF THE INVENTION

1. Field of the Invention

The present invention refers to an angular position transducer for a rotating member which preferably, but not exclusively, is the selection shaft of a type-bearing element or the driving shaft displacing the carriage of office printing machines.

2. Description of the Prior Art

Several examples of transducers are known which use a disc connected to the rotating member having on its periphery a set of active parts, and a detector which senses the progressive approach of these active parts, thus generating electrical signals which indicate the corresponding law of motion. The transducers may be of various types, e.g. optical, inductive or capacitive.

The angular position being constant, each error in the axial distance between the periphery of the disc and the detector causes a variation in the electrical signal of the detector and generates an error in the parameter to be measured. In order to minimize this inconvenience the transducers comprise a supporting structure in which the disc shaft rotates on precision bearings. The structures of the transducer is fixed directly to the rotating member support, whilst the disc shaft is connected to the rotating member by means of a decoupling joint or, alternatively, a flexible shaft. Both solutions cause an increase in the overall dimensions and cost of the rotating member-transducer combination and complications in mounting the transducer on the member itself.

Another cause of error is the variation in the electrical response due to temperature, supply voltage and other external effects.

It is therefore an object of this invention to provide a position transducer for a rotating member in which the position errors are minimized and which is also simple and economical.

Another object of this invention is to provide a position transducer using a disc which may be simply and economically connected to the member.

Another object of this invention is to provide a transducer which allows axial displacements of the rotating member without large errors in misalignment between the structure of the transducer and the axis of the rotating member.

SUMMARY OF THE INVENTION

This invention relates to a position transducer in which the structure of the transducer may be fixed coaxially to the support of the rotating member, in which the disc may be fixed directly to said member and may rotate with ample clearance on the structure of the transducer.

According to another characteristic, the disc is fixable to the member by means of a thin flexible lamina, and is guided in a zone on its periphery by a guiding element adjacent to said detector in such a way that the flexibility of the lamina compensates for any misalignment and axial displacement of said rotating member, thus maintaining the distance between the detector and the periphery of the disc substantially constant.

According to a further characteristic, the position detector generates a periodic signal at the terminals of a reference resistor, and a control circuit is provided to modify the value of the resistor to maintain the peak value of the periodic signal rather constant.

BRIEF DESCRIPTION OF THE DRAWINGS

These and other characteristics of the present invention will be clear from the following description of a preferred embodiment made by way of example and not intended to be limiting, with the aid of the following drawings in which:

FIG. 12 is a circuit diagram of the transducer of FIG. 10

FIG. 13 is an exploded perspective view according to a further embodiment of the transducer according to the invention.

DESCRIPTION OF THE PREFERRED EMBODIMENT

Figure 2:
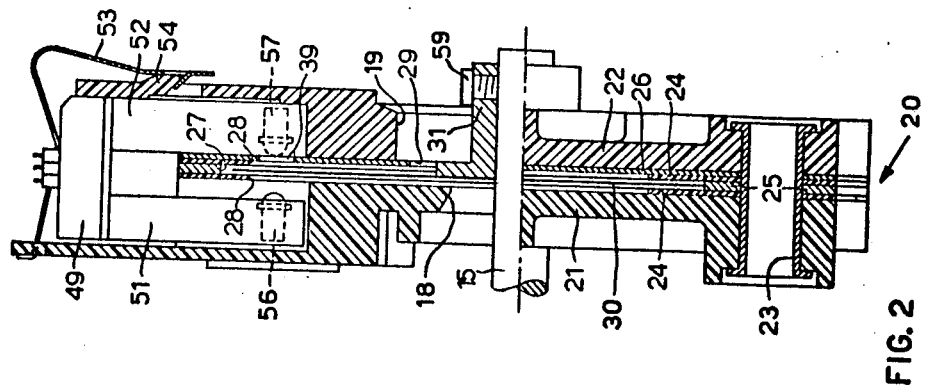
FIG. 2 is a section according to the line II—II of the FIG. 1
Figure 3:
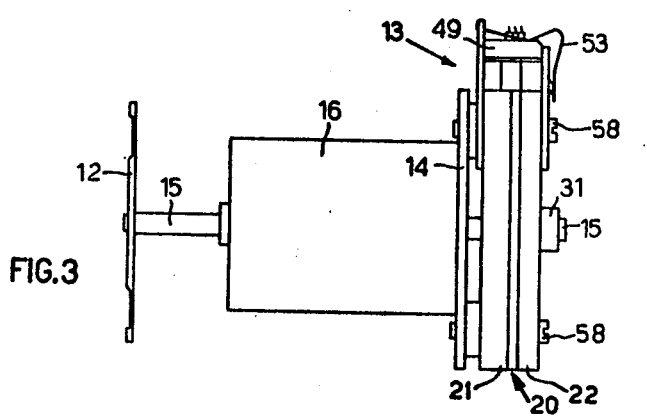
FIG. 3 is a schematic side view of a particular application of the transducer of FIG. 1

With reference to FIG. 3, the transducer, generically indicated by 13, is applied to the shaft 15 of a motor 16, which can command the selection of a type bearing element 12 or the displacement of the carriage of a printing group in an office machine. The transducer 13 comprises a shell 20, made of plastic material, fixable to a flange 14 of the motor 16 and constituted by two quadrangular halfshells 21 and 22, resp., adjacent to the motor 16 and to the free end of the shaft 15, and having a central hole 18 and respectively, 19 for the shaft 15, (FIG. 2). The half-shells 21 and 22 have ribs 17 (FIG. 1) and are rigidly fixed together, for example, by four riveted eyelets 23. In the event that the shaft 15 be subjected to axial displacements, the half-shells 21 and 22 are separated by two guides 24 held in contact by a spacer 25. In particular, a guide 24 is in contact with the half-shell 21, whilst the other guide 24 is in contact with a mask or shield 26, which in turn is in contact with the half-shell 22. All these various parts 24, 25 and 26 have the same external form as the half-shells 21 and 22.

The spacer 25 has a central cylindrical hole 27 which defines by its thickness a space between the guides 24 wherein a metallic disc 30, soldered to a face of the fixing hub 31 of the shaft 15 rotates with minimum play. The hub 31 is freely housed in a hole 29 of the mask 26 and in the hole 19 of the halfshell 22, whilst the part of the shaft 15 adjacent to the motor 16 is freely housed in the hole 18 of the half-shell 21 (FIG. 2). In turn, the guides 24 have a central hole 28 coaxial to the hole 27 of the spacer 25 but smaller, so that the disc 30 is guided on its periphery by the two circular rims of the guides 24, defined by the holes 28 of the guides 24 and the hole 27 of the spacer 25.

The disc 30 has a diameter of 40 mm. and is obtained from a lamina made of spring steel of thickness 0.05 mm. which gives the disc good flexibility in response to low flexing forces. The guides are punched from polyester resin sheets of thickness 0.1 mm., with a diameter of 38 mm. of the hole 27, having a very low friction coefficient with respect to the disc 30. The spacer 25 is obtained from a lamina made of spring steel of thickness 0.3 mm., with a diameter of about 42 mm. of the hole 27, whilst the mask 26 is obtained from a bronze lamina of thickness 0.1 mm. with diameter of the hole 29 of 25 mm.

Figure 4:
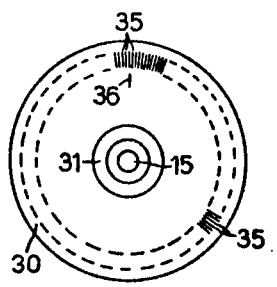
FIG. 4 is a front view of a particular of FIG. 1

The disc 30 has on its periphery at about 1.5 mm. from its edge, 200 position notches (FIG. 4) radially disposed and equally spaced constituted by substantially rectangular windows 35 each having a radial dimension of about 2.5 mm. and a width of 0.26 mm. which is a little less than ½ the pitch of the notches. Moreover, the disc 30 has a synchronization notch constituted by a window 36 having the same radial dimension as the windows 35, but slightly wider and with its edges out of phase with respect to those of the windows 35. Both the window 36 and the windows 35 may be obtained with high precision with respect to pitch and width using a well known photoengraving process.

Figure 5:
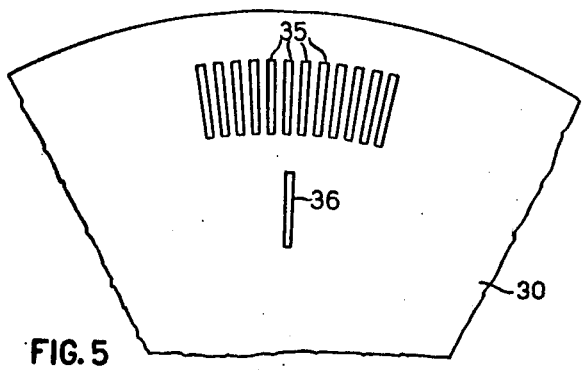
FIG. 5 is an enlarged detail of the particular of FIG. 4
Figure 6:
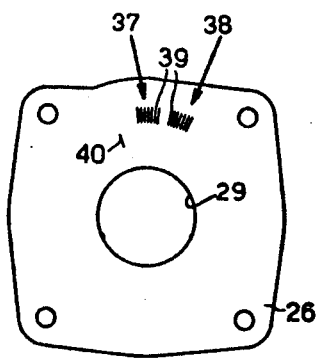
FIG. 6 is a front view of another particular of FIG. 1

Opposite the rim of the windows 35 the mask 26 (FIG. 6) comprises two groups 37 and 38 of seven windows 39 having the same shape and disposition as the windows 35 of the disc 30. The two groups 37 and 38 are separated by a zone without windows and the edges of the windows 39 of the second group 38 are out of phase by ¼ of the pitch with respect to the corresponding edges of the windows of the first group 37. At the same radial distance as the synchronisation window 36 is a window 40 equal to the window 36, displaced eight pitches with respect to the first window 39 of the group 37 lying opposite the group 38, and with the same phase displacement as between the windows 36 and 35 (FIG. 5) of the disc 30.

The two half-shells 21 and 22 (FIG. 1) have three aligned notches 45, 46 and 47 having a rectangular section opened towards the layers 24–27, which house three forked supports 48, 49 and 50 respectively. A first arm 51 (FIG. 2) of each forked support 48–50 is positioned opposite the rear guide 24, whilst the other arm 52 is in contact with the mask 26. Three elastic tongues 53, acting on stops 54 of the half-shell 22, fix the three supports 48–50 to the notches 45–47. The supports 48–50 each house on opto-electronic pair suitable for detecting the presence of the windows 35 and 36 of the disc 30. To this purpose, an illuminator 56 and an optical light detector 57, constituted, for example, by a photodiode and a phototransistor, are housed in two holes in the arms 51 and 52.

In a typical application, the opto-electronic pair of the support 48 (FIG. 1) is used to detect a reference or zero position of the shaft 15. The pairs of the supports 49 and 50 are instead used to determine two cyclical signals having period corresponding to the angular pitch of the windows 35, which indicate the instantaneous position of the shaft 15, and whose mutual phase indicates its direction of rotation. From these position signals the modulus and sign of a corresponding velocity signal can be derived, as described, for instance, in U.S. Pat. No. 2,979,623.

According to the invention, the phototransistor 57, housed in the support 48, is positioned in front of the window 40 of the mask 26 (FIG. 6), whilst the phototransistors 57, housed in the supports 49 and 50, are positioned in front of the groups 37 and 38. The hole of the arm 52 has a diameter of 1.5 mm. such that each of the phototransistors of the supports 49 and 50 receive the light emerging from three of the windows 37 and 38, whilst the phototransistor of the support 48 receives light emerging from the window 40. The flux of light collected by the three windows is substantially independent of the centering of the light sensitive element of the phototransistor with respect to the groups of windows. Also the errors in pitch and dimension which exist among the various windows 35 and 39 are thus statistically mediated, without reducing the resolution power of the disc 30.

For mounting, the shell 20 is centered with respect to the shaft 15 (FIG. 3) by a suitable tool, not shown in the drawing, such that the holes 18 and 19 (FIG. 2) are coaxial to the shaft 15. The shell 20 is then fixed to the flange 14 by screws 58 passing through the eyelets 23. The hub 31 is then fixed to the shaft 15 by a screw 59 (FIG. 2) at a predetermined position with respect to the shell 20, determined, for instance, by the same tool used to mount the shell. The disc 30 and the hub 31 are soldered together in such a way that the axis of the shaft 15 coincides with the axis of the disc 30 when the screw is completely tightened in to shaft 15.

With the previously described structure, it is clear that a consequence of peripheral guiding is that the axial distances between the windows 35 of the disc 30 and the two parts of the opto-electronic pair are kept substantially constant, even in the event that the shaft 15 is subject to axial displacements. In fact, the compliance of the disc 30 prevents the transmission of such displacements towards the periphery in the reading zone of the windows 35.

In the event that the shaft 15 is not subject to axial displacements, the disc 30 is soldered onto a hub 31 of larger radius, which leaves free only the windowed periphery of the disc 30. In this case the disc 30 rotates without deformation in a fixed axial position, without touching the guides 24 which can be therefore eliminated.

Figure 8:
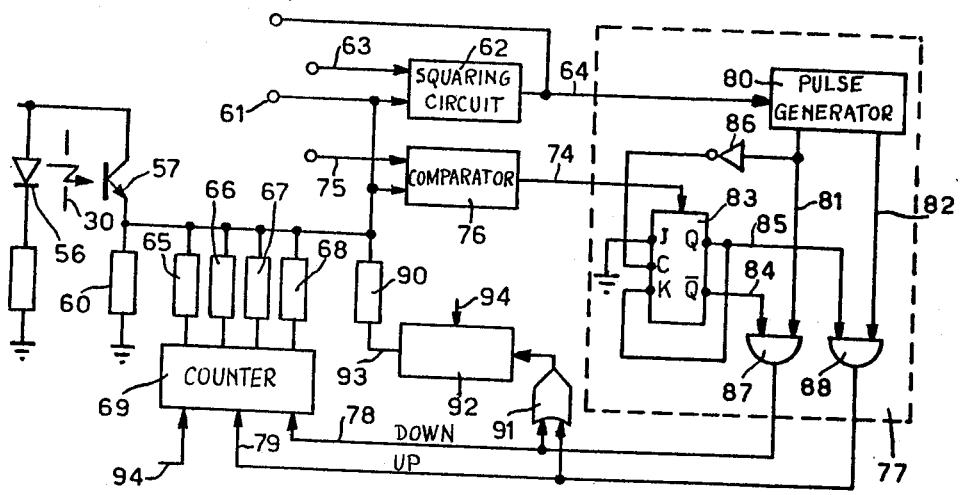
FIG. 8 is a circuit diagram of a control circuit for the transducer of FIG. 1
Figure 9:
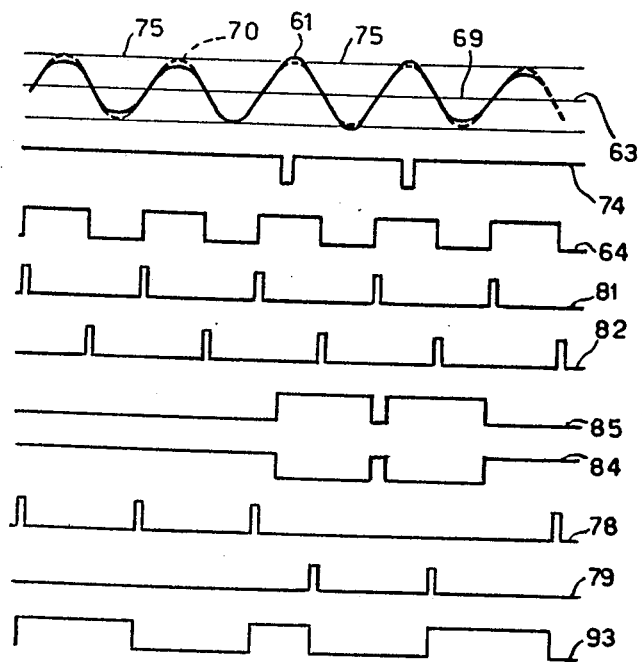
FIG. 9 is a diagram of some electrical signals of the circuit of FIG. 8

With reference to FIGS. 8 and 9, the phototransistor 57 is used as an emitter-follower having the collector directly connected to the power supply and the emitter earthed using a high value resistor 60. In the range of one angular pitch of the disc 30, the emitter voltage 61 is substantially sinusoidal with a non-zero average value, and supplies power to a squaring up circuit 62. The circuit 62 (FIG. 8) compares the voltage 61 with a constant reference voltage 63 and generates a substantially symmetric square signal 64. The commutations of the signal 64 define zeroes of the shaft 15 associated with half-pitch rotations of the disc 30. The voltage 61, compared with the voltage 63, can be directly used in a continuous mode as an analogue position signal of the shaft 15.

In the scheme used here, the transistor 57 can be considered as a generator of constant current, whose value depends on the light flux received, and on the response characteristics of the transistor 57. The voltage 61 is therefore substantially proportional to the value of the resistor earthing the emitter. According to the invention, this value is fixed so as to render the voltage 61 as far as possible equal to a theoretic voltage 70, shown by the dotted line in FIG. 9, with variations in the light flux of the photodiode 56 or the response of the phototransistor 57. To this end, four resistors 65–68, having progressively different values according to powers of two, are connected on one side in parallel with the emitter of the transistor 57 and on the other to four outputs of an up-down counter 69. The logical zero of one or more of the outputs of the counter 69 arranges in a coded manner one or more resistors 65–68 in parallel with the resistor 60.

The voltage 61 is compared with a threshold voltage 75 equal to the peak value of the theoretical signal 70 by a comparator 76. If the value of the signal 61 is lower than the signal 75, the output signal 74 of the comparator 76 remains at the logical high level and activates a regulating circuit 77 which sends a pulse 78 into the down-counting input of the counter 69. As a consequence, the counter 69 disconnects the resistor 65–68 having the highest sequential value. If the peak value of 61 is higher than the signal 75, the signal 74 is momentarily zeroed and the circuit 77 sends a pulse 79 to the up-counting input of the counter 69. The latter now inserts the resistor 65–68 with highest sequential value. Both the correction for increase and that for decrease are effected in the same angular pitch of the disc 30 in which the decrease or the increase of the voltage 61 has been detected. The voltage 61 is therefore always very close to the theoretical value 70, giving very precise analogue or zero references and not influenced by the response of the pair 56, 57.

The regulating circuit 77, by way of example, comprises a circuit 80 driven by the signal 64 which generates pulses 81 and 82 respectively (FIG. 9) in corrispondence to the upward and downward slope of the signal 64. A J-K flip-flop 83 (FIG. 8) is set by the signal 74 of the comparator 76 to force at logical 1 level the true output 85 and at logical 0 level the inverted output 84. The flip-flop 83 is clocked by the pulses 81 which are inverted in 86, while the input J is held at zero and the input K is connected to the true output 85. The rise over the peak value 75, detected by 76, is stored in the outputs 84 and 85 of the flip-flop 83 until pulse 81 returns to zero. The logical high value of the outputs 84 and 85 activate an input of two AND gates 87 and 88, controlled at another input by the pulses 81 and 82 respectively, so as to generate the input signals 78 and 79 to the counter 69. In particular, when the peak value of the signal 61 is lower than 75, the outputs 85 and 84 remain low and high respectively; the pulse 81 passes through the gate 87 and, as 78, causes one of the resistors 65–68 of the counter 69 to disconnect after rotation of ¾ pitch of the disc 30 with respect to zero. The modulus of the voltage 61, referred to the signal 63, will therefore tend to increase immediately after its second passage through zero. When the signal 61 is higher than the signal 75, the low signal 74 forces to zero and to a high level the outputs 85 and 84 respectively, deactivating the gate 87 and activating the gate 88. The first pulse 82 can thus pass, as 79, to the counter 69 and inserts one of the resistors 65–68 after rotation of ¼ pitch of the disc 30 with respect to zero. The modulus of the voltage 61, referred to the signal 63, tends therefore to decrease immediately after the first passage through zero of the voltage 61. On return to zero, the pulse 82 changes over once again the outputs 84 and 85 to high and low values respectively. A continued high value of the signal 61 would bring the output 84 to zero for a new insertion of the resistors 65–68 as previously described.

The angular phase for the above defined insertion and exclusion of the resistors 65–68 prevents artifical alterations of the slope of the signal 61. The insertion of the resistor after ¼ pitch, while the signal, which is too high, is in the descending period, further reduces the signal so as to approach the theoretical signal. The exclusion of the resistor after ¾ pitch while the signal, which is too low, is already increasing, causes a further increase. This prevents a resistor excluded soon after reading the peak value, or inserted late, causing an increase or decrease in the signal 61 which, during its increase or decrease might be erroneously detected by the squaring circuit as zeroes of the shaft 15.

In order to reduce variations in voltage due to insertion of one of the resistors 65–68, all the pulses 78 and 79 cause alternately the insertion and disconnection of a resistor 90 whose value is twice that of the highest value of the resistors 65–68. By way of example, an OR gate 91 may be used, activated by the signals 78 and 79 and by a flip-flop 92 which changes over one of its outputs 93 from zero to the high value, and vice versa, on each command pulse of the gate 91. On switching on the circuit, a signal 94 forces an output 93 of the flip-flop 92 to a high value and sets a predetermined value on outputs of the counter 69. The resistor 90 is thus inserted, while a predetermined number of resistors 65–68 are inserted to determine the initial position of the regulating circuit.

Figure 1:
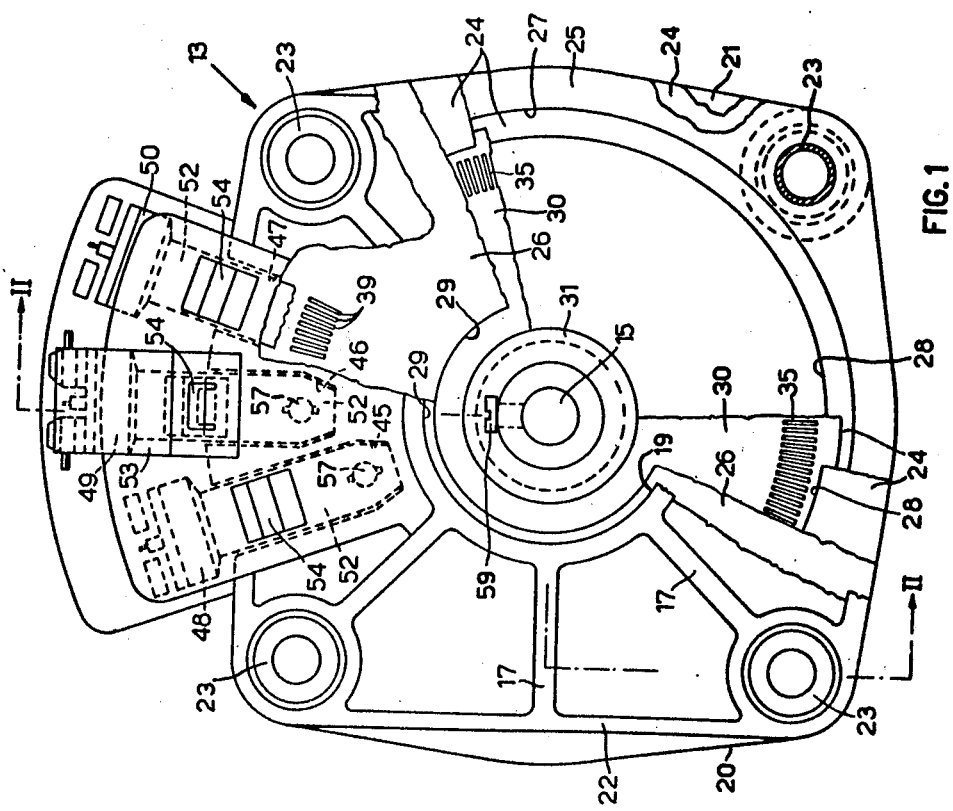
FIG. 1 is a partially sectioned front view of the transducer according to an embodiment of the invention.
Figure 10:
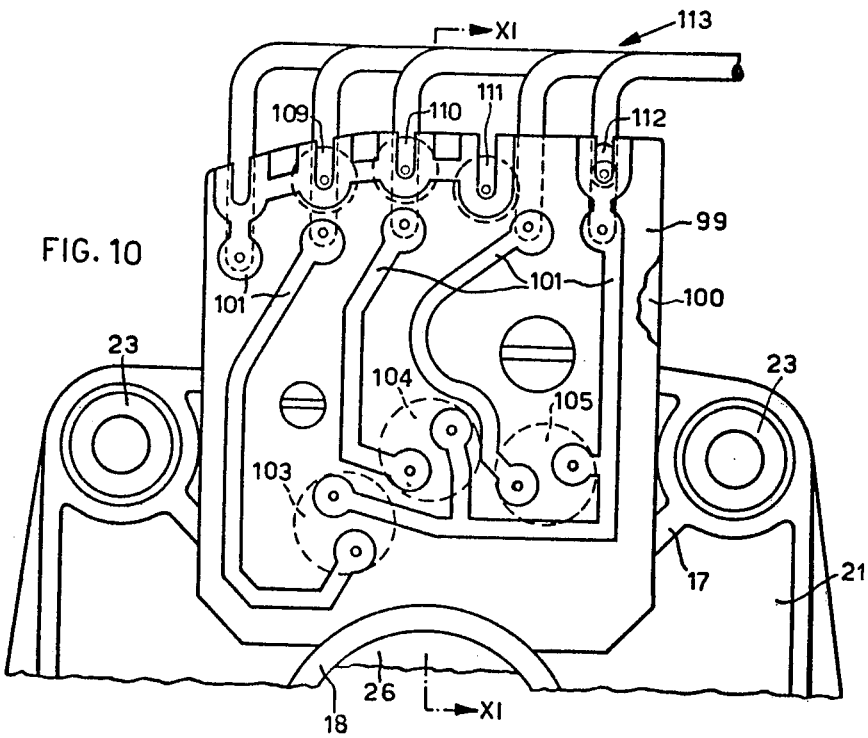
FIG. 10 is a partial front view of another embodiment of the transducer of FIG. 1
Figure 11:
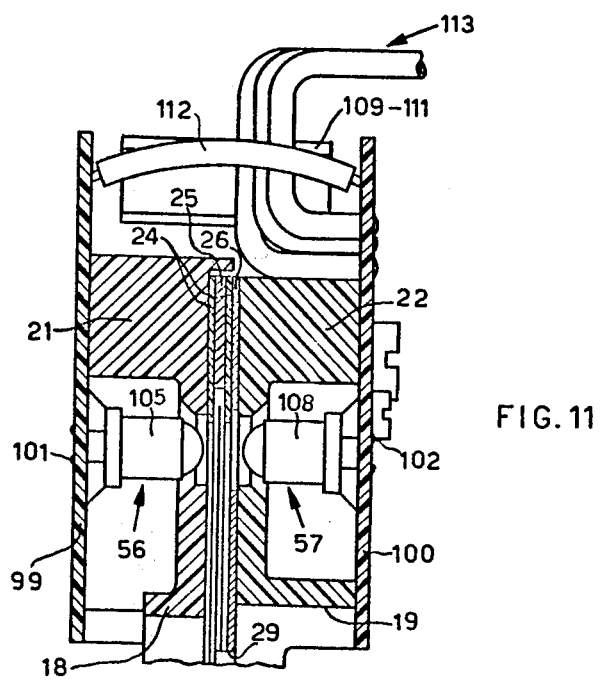
FIG. 11 is a section according to the lines XI—XI of FIG. 10

According to another embodiment, the half shells and the disc are similar to those previously described, while the photodiodes and phototransistors of the three optoelectronic pairs of the three supports 48–50 shown in FIG. 1 are individually incorporated in containers of the type TO 18 to collect the light passing through six windows 39 of the mask 26. The elements of the pairs are connected to circuits of two boards 99 and 100 (FIG. 10) fixed to the half-shells 21 and 22 respectively. In particular, the photodiodes indicated by 103, 104 and 105 are soldered to a printed circuit 101 of the board 99, and the phototransistors indicated by 106, 107 and 108 (FIG. 12) are soldered to a printed circuit 102 of the board 100. Three resistors 109, 110 and 111 (FIG. 12) connected in series to the corresponding photodiodes 103–105 allow the definition of the average current of the transistors in steady state. The resistors 109–111 are soldered to forked terminals of the two circuits 101 and 102 (FIG. 10) and together with a stiff wire 112 contribute to rigidly connect the two boards 99 and 100. Finally, a set of cables 113 connects the transducer to the utilisation circuit.

Figure 7:
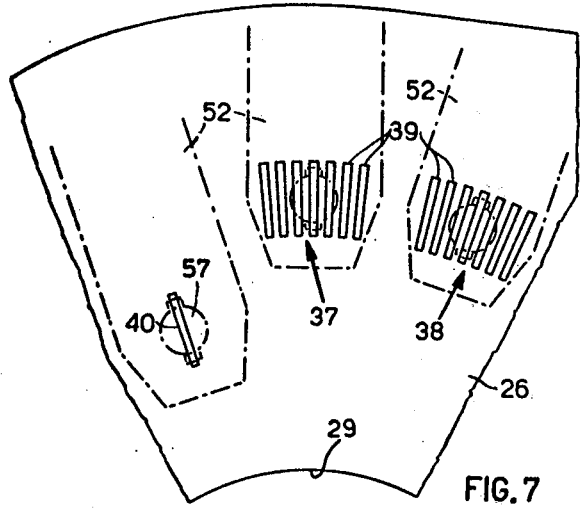
FIG. 7 is an enlarged detail of the particular of FIG. 6

According to a further embodiment, guides, spacer and disc, indicated by 114 and 115, 116 and 117 respectively (FIG. 13) are substantially the same as those previously described, whilst the opto-electronic pairs are constituted by a single photodiode 120 and six photovoltaic cells 121–126 mounted on a board 127 and shielded by six groups of windows 128–133 of a mask 134. The cell 121 is positioned off the periphery of the disc 117 and receives part of the light of the photodiode 120 through windows 135, 136 and 137 of the guides 114 and 115, and the spacer 116, respectively. The voltage of the cell 121 is not influenced by the rotation of disc 117 and is used to maintain constant light flux of the photodiode 120. The windows 129 and 131 are arranged in front of the upper half of the windows 35, displaced a quarter of a pitch therebetween, and are constituted by six slits of width equal to the windows 35 and half the height. These windows 129 and 131, together with the cells 122 and 124 have the same function as the windows 39 and the phototransistors 57 mounted on the supports 49 and 50 of FIG. 7. The windows 130 and 132, also constituted by six slits equal in width to the windows 35, are positioned in front of the lower half of the windows 35 and are displaced by half a pitch with respect to the windows 129 and 131. A second mask 140, adjacent to the photodiode 120, and a third mask 141, adjacent to the cells 121–126, distribute the light of the photodiode 120 to the outside of the disc 117 towards the cell 121 and towards the windows 35 and 36 and from the windows 129–133 to the cells 122–126 respectively by means of apertures 142 and 143 of the mask 140 and 144–147 of the mask 141. The path defined by the apertures 142, 135, 137, 136, 128 and 144 avoid that light dispersions, independent of the rotation of the disc 117, reach cells 122–126. Similarly, the path defined by the apertures 145 and 146 allow the cells 122, 124 and 123, 125 to collect only the light emerging from the windows 129, 131 and 130, 132 respectively, whilst the aperture 147 allows the cell 126 to collect only the light from the window 133.

The signals coming from the photocells 122 and 123 and 124 and 125 respectively, are mutually out of phase by 180°. Their amplitude is determined, apart from the angular position of the disc 117, by the response of each individual cell to variations in the light flux from zero to its maximum value. The algebraic sum of the two signals mutually out of phase by 180° and the subsequent amplification by the two amplifiers 150 and 151 reduce the distortions due to the non-linear response of the two pairs of cells. At the output of these amplifiers 150 and 151, two signals out of phase by 90° are obtained, which vary according to a substantially sinusoidal law, in response to the various angular positions of the disc 117.

What is claimed is:

1. An optical transducer for detecting the angular position of a rotating shaft with respect to a fixed part comprising:
   a unit comprising a substantially closed body having a transverse cavity and a central through hole which crosses said cavity for lodging with ample clearance said rotating shaft, a disc provided with a plurality of radial openings lodged with ample clearance inside said transverse cavity, and light generating and detecting means mounted inside said closed body for detecting the passage of said radial openings and generating corresponding electrical signals, and
   means for mounting said unit in cooperative relation to said shaft and said fixed part, said means comprising first means for axially positioning said disc with respect to said rotating shaft, second means for centering said body with respect to said rotating shaft, and third means for fixing said body to said part in its centered position.

2. An optical transducer according to claim 1, wherein said substantially closed body comprises two half shells and an interposed spacer, and wherein said cavity is provided in said spacer.

3. An optical transducer according to claim 1, wherein said disc is fixed to a hub lodged with ample clearance inside said central hole and having a cylindrical aperture perpendicular to said disc for being mounted on said rotating shaft.

4. An optical transducer according to claim 1, wherein said light generating and detecting means comprise a pair of optoelectronic elements having an illuminator and a light detector which are disposed in front of said openings, at opposite points with respect to said disc.

5. An optical transducer according to claim 1 wherein said disc is constituted by a thin metallic lamina.

6. An optical transducer according to claim 1 wherein said disc comprises a thin metallic and flexible lamina, further comprising guide means for guiding said lamina in a peripheral zone of said disc.

7. In an optical transducer for detecting the angular position of a rotating member with respect to a fixed structure comprising a disc provided with a plurality of peripheral openings and an optoelectronic pair comprising illuminator and detector means for detecting the angular positions of said disc, the combination comprising:
   structural parts supporting said optoelectronic pair and assemblable to obtain a substantially closed shell defining a cavity in the interior of said shell,
   means for fixing together said structural parts to obtain said shell and to accommodate said disc in said cavity independently from said rotating member and interposing a group of said openings between the illuminator and the detector means of said optoelectronic pair, wherein said cavity enables said disc to rotate therein and to be adjusted with respect to said illuminator and detector means,
   means for mounting the disc accommodated in said cavity on said rotating member to be movable coaxially along said rotating member,
   means for fixing said shell with respect to said fixed structure in a centered position relative to each other causing said plurality of openings to be aligned with respect to said illuminator and detector means when said disc is mounted on said rotating member, and
   means for fixing said disc to said rotating member in a predetermined relationship with respect to the centered position of said shell.

* * * * *